United States Patent
Okazaki et al.

(10) Patent No.: US 11,727,802 B2
(45) Date of Patent: Aug. 15, 2023

(54) TRANSPORTATION SYSTEM, SERVICE MANAGEMENT DEVICE, AND SERVICE MANAGEMENT METHOD

(71) Applicants: TOYOTA JIDOSHA KABUSHIKI KAISHA, Toyota (JP); DENSO CORPORATION, Kariya (JP)

(72) Inventors: Kenji Okazaki, Toyota (JP); Hiroshi Higashide, Toyota (JP); Keiichi Uno, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 87 days.

(21) Appl. No.: 17/215,007

(22) Filed: Mar. 29, 2021

(65) Prior Publication Data
US 2021/0312807 A1    Oct. 7, 2021

(30) Foreign Application Priority Data
Apr. 2, 2020    (JP) .................................. 2020-066596

(51) Int. Cl.
*G08G 1/123* (2006.01)
*G08G 1/00* (2006.01)
(Continued)

(52) U.S. Cl.
CPC ............. *G08G 1/123* (2013.01); *G07C 5/008* (2013.01); *G07C 5/0808* (2013.01);
(Continued)

(58) Field of Classification Search
CPC ........ G08G 1/127; G08G 1/20; G08G 1/0133; G08G 1/0145; G08G 1/09623; G08G 1/123; G07C 5/008; G07C 5/0808
See application file for complete search history.

(56) References Cited

U.S. PATENT DOCUMENTS 6,006,159 A  * 12/1999  Schmier ................. G08G 1/123
                                                          340/988
2017/0072974 A1   3/2017  Morita et al.
(Continued)

FOREIGN PATENT DOCUMENTS

| CN | 110738843 A | 1/2020 |
| JP | 2005-222144 A | 8/2005 |

(Continued)

OTHER PUBLICATIONS

Transportation Research Part C 102 (2019) 370-395 (Year: 2019).*

*Primary Examiner* — Maceeh Anwari
*Assistant Examiner* — Aarron E Santos
(74) *Attorney, Agent, or Firm* — Oliff PLC

(57) ABSTRACT

A transportation system includes a traveling route, vehicles, and a service management device. The service management device includes a timetable generator that generates a timetable for each of the vehicles, and a communication device that is configured to receive passenger information at least from the vehicles or stops. The timetable generator calculates a boarding and alighting time estimate of the vehicle at the stop based on at least the passenger information such that a higher average speed of the vehicle between the stops and a longer dwell time of the vehicle at the stop are set for a longer boarding and alighting time estimate.

11 Claims, 12 Drawing Sheets

(51) Int. Cl.
*G07C 5/08* (2006.01)
*G08G 1/01* (2006.01)
*G07C 5/00* (2006.01)

(52) U.S. Cl.
CPC ......... *G08G 1/0133* (2013.01); *G08G 1/0145* (2013.01); *G08G 1/20* (2013.01)

(56) References Cited

U.S. PATENT DOCUMENTS

2019/0039634 A1  2/2019  Tokumaru
2020/0027284 A1  1/2020  Anabuki

FOREIGN PATENT DOCUMENTS

| JP | 2014-220859 | A |   | 11/2014 |
|----|-------------|---|---|---------|
| JP | 2015-182654 | A |   | 10/2015 |
| JP | 2018-135077 | A |   | 8/2018 |
| JP | 2019-197268 | A |   | 11/2019 |
| JP | 2019197268  | A | * | 11/2019 |
| WO | 2017/168585 | A1 |  | 10/2017 |

* cited by examiner

NUMBER OF WAITING PASSENGERS AT STOP C

TRANSPORTATION SYSTEM, SERVICE MANAGEMENT DEVICE, AND SERVICE MANAGEMENT METHOD

CROSS REFERENCE TO RELATED APPLICATION

This application claims priority to Japanese Patent Application No. 2020-066596 filed on Apr. 2, 2020, which is incorporated herein by reference in its entirety including the specification, claims, drawings, and abstract.

TECHNICAL FIELD

The present disclosure relates to a transportation system which includes multiple vehicles that autonomously travel along predetermined traveling routes, a service management device which controls the multiple vehicles, and a service management method.

BACKGROUND

Service management devices which control travel of multiple vehicles are already known. For example, JP 2005-222144 A discloses a service information center for managing multiple buses in which each of the busses sends traveling status information, such as the location and occupancy rate of the bus, to the service information center. The service information center determines whether or not to change a service schedule of the busses based on the received traveling status information in order to average the degree of congestion among the busses and optimize intervals between the busses. Possible changes are a skip of a usual bus stop and a change in speed. In JP 2005-222144 A, for example, when one of the busses is crowded or the following bus is too close, the congestion is averaged and the service intervals are optimized by controlling the bus to skip a prescheduled bus stop, and having the following bus pick up the passengers at the skipped bus stop.

Note that the congestion is likely to be high when buses are delayed from a scheduled timetable. Specifically, when a bus is delayed from a scheduled timetable and the interval from the previous bus becomes longer, the delayed bus is likely to become crowded as passengers become concentrated on that bus. As such, in this type of transportation system, it is desirable to be able to control a delay which would otherwise increase congestion.

However, in the techniques disclosed in JP 2005-222144 A, no steps to reduce the congestion or optimize the service intervals are taken until increased congestion is noted. As such, with the techniques disclosed in JP 2005-222144 A, because congestion can be excessively high, albeit temporarily, passengers are more likely to judge the transportation system to be inconvenient.

The present specification discloses a transportation system, a service management device, and a service management method that can improve convenience.

SUMMARY

A transportation system according to an embodiment of the present disclosure includes a traveling route along which multiple stops are set, a chain of vehicles that are configured to autonomously travel along the traveling route, and a service management device that is configured to manage traveling of the vehicles. The service management device includes a timetable generator that is configured to generate a timetable for each of the vehicles, and a communication device configured to send the timetable to the vehicles and receive passenger information about passengers of the transportation system at least from the vehicles or the stops. The timetable generator is configured to generate the timetable by calculating a boarding and alighting time estimate of each of the vehicles at each of the stops based on at least the passenger information such that a higher average speed of the vehicle between the stops and a longer dwell time of the vehicle at the stop are set for a longer boarding and alighting time estimate.

As the dwell time and the average speed are determined based on the boarding and alighting time estimate that has been calculated based on the passenger information, the boarding and alighting of passengers are likely to be completed before the scheduled departure time, reducing vehicle delays and, thus, congestion of passengers in the vehicles. As a result, the convenience of the transportation system can be improved.

The timetable generator may generate the timetable such that when the boarding and alighting time estimate is equal to or less than a preset tolerable boarding and alighting time, the dwell time and the average speed are set to preset values regardless of the calculated boarding and alighting time estimate.

Such a configuration can prevent an excessive slowing of the average speed of the vehicles between the stops.

Each of the vehicles may include an in-vehicle sensor that is configured to obtain on-board passenger information including at least the number of boarded passengers and an attribute about the boarded passengers, and to send the on-board passenger information to the service management device. The passenger information may include the on-board passenger information.

As the passenger information includes information actually obtained inside the vehicle, the accuracy of the boarding and alighting time estimate can be improved.

The timetable generator may calculate overall alighting time of each of the vehicles based on the on-board passenger information and further calculate the alighting time estimate of the vehicle at each of the stops by dividing the calculated overall alighting time of the vehicle by preset ratios for each of the stops.

Such a configuration can improve the accuracy of the boarding and alighting time estimate.

Each of the stops may include an at-stop sensor that is configured to obtain waiting passenger information that includes at least the number of waiting passengers and an attribute about the waiting passengers, and to send the waiting passenger information to the service management device. The passenger information may include the waiting passenger information.

As the passenger information includes the information actually obtained at the stops, the accuracy of the boarding and alighting time estimate can be improved.

Each stop may periodically send the waiting passenger information to the service management device. The timetable generator may calculate increase per unit time of boarding time of the waiting passengers at the stop based on the waiting passenger information, and further calculate a boarding time estimate for each for the vehicles at the stop based on the calculated increase per unit time.

Such a configuration can also improve the accuracy of the boarding and alighting time estimate.

The attribute may include at least one of a presence or absence of a passenger using a wheelchair, a white cane, orthoses, or a stroller, and age groups.

Such a configuration can further improve the accuracy of the boarding and alighting time estimate.

Each of the vehicles may be configured to send traveling status information that indicate a traveling status of the vehicle to the service management device. When the timetable generator determines, based on the traveling status information, that there is an disabled vehicle that cannot continue service, the timetable generator may calculate the boarding and alighting time estimate of the vehicle following the disabled vehicle at a next scheduled stop of the disabled vehicle based on the on-board passenger information of the following vehicle, waiting passenger information at the next scheduled stop, and the on-board passenger information of the disabled vehicle.

Such a configuration can enable an efficient response to the increase of the boarding and alighting time due to a disabled vehicle, and can thus effectively reduce the delay or other problems of the vehicles.

When the disabled vehicle is capable of traveling to the next scheduled stop, the timetable generator may generate the timetable by assuming that the passengers on the disabled vehicle are to transfer to the following vehicle at the next scheduled stop.

Such a configuration can enable the passengers of the disabled vehicle to efficiently transfer to the following vehicle. As such, even when a vehicle becomes disabled, passengers can be reliably transported to their destinations.

When the disabled vehicle is not capable of traveling to the next scheduled stop, the timetable generator may generate the timetable such that, by assuming that the passengers on the disabled vehicle are to transfer to the following vehicle at a temporary stop where the disabled vehicle stopped, the following vehicle is temporarily stopped at the temporary stop.

Such a configuration can enable the passengers of the disabled vehicle to efficiently transfer to the following vehicle. As such, passengers can be reliably transported to their destinations even when a vehicle becomes disabled.

A service management device according to an embodiment of the present disclosure includes a timetable generator that is configured to generate a timetable for each of the vehicles that are configured to autonomously travel along a preset traveling route. The service management device further includes a communication device that is configured to send the timetable to the vehicles and receive passenger information about passengers of the vehicles from at least the vehicles or the stops along the traveling route. The timetable generator is configured to generate the timetable by calculating a boarding and alighting time estimate of each of the vehicles at each of the stops based on at least the passenger information such that a higher average speed of the vehicle between the stops and a correspondingly longer dwell time of the vehicle at the stop are set when a longer boarding and alighting time is estimated.

A service management method according to an embodiment of the present disclosure includes receiving, at least from vehicles that are configured to autonomously travel along a preset traveling route or stops along the traveling route, passenger information about passengers of the vehicles. The service management method also includes calculating a boarding and alighting time estimate of each of the vehicles at each of the stops based on at least the passenger information, and generating a timetable of each of the vehicles such that a higher average speed of the vehicle between the stops and a longer dwell time of the vehicle at the stop are set for a longer boarding and alighting time estimate. The service management method further includes sending the timetable to the vehicles.

The techniques according to disclosure of the present specification can improve convenience of a transportation system.

BRIEF DESCRIPTION OF THE DRAWINGS

Embodiments of the present disclosure will be described based on the following figures, wherein.

DESCRIPTION OF EMBODIMENTS

Figure 1:
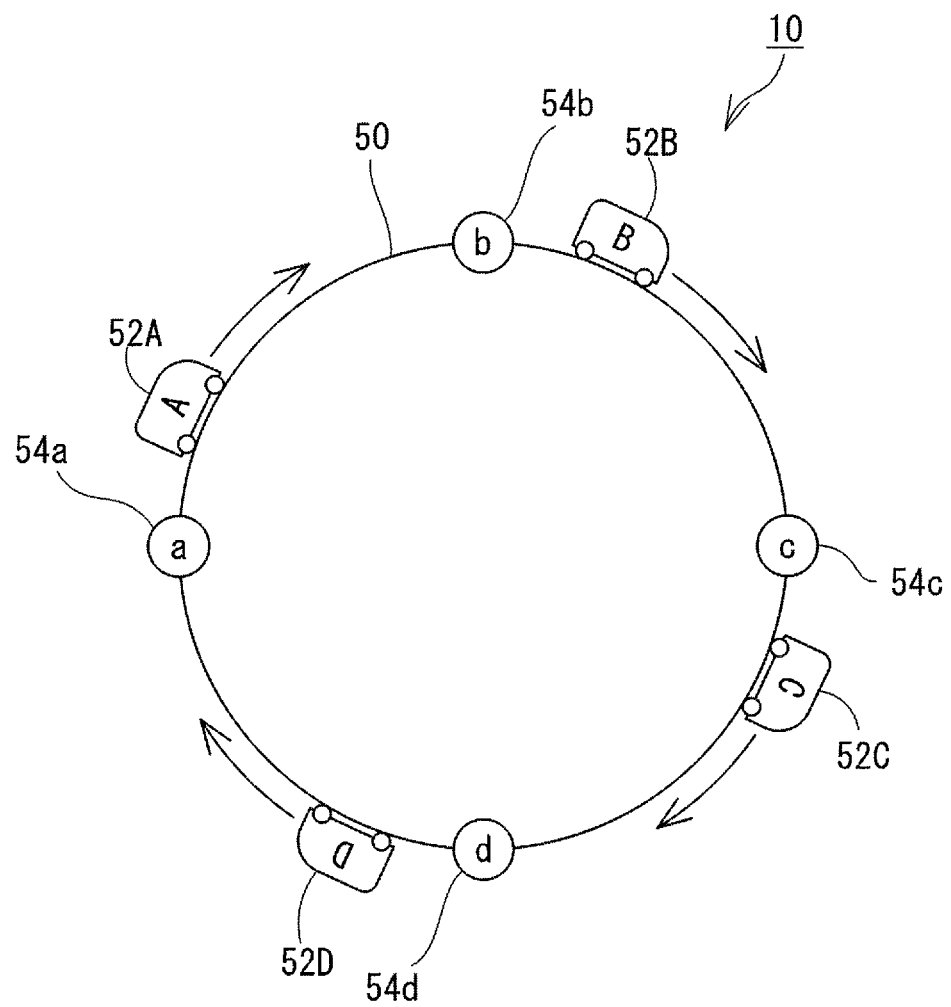
FIG. 1 is an image of a transportation system according to an embodiment of the present disclosure.
Figure 2:
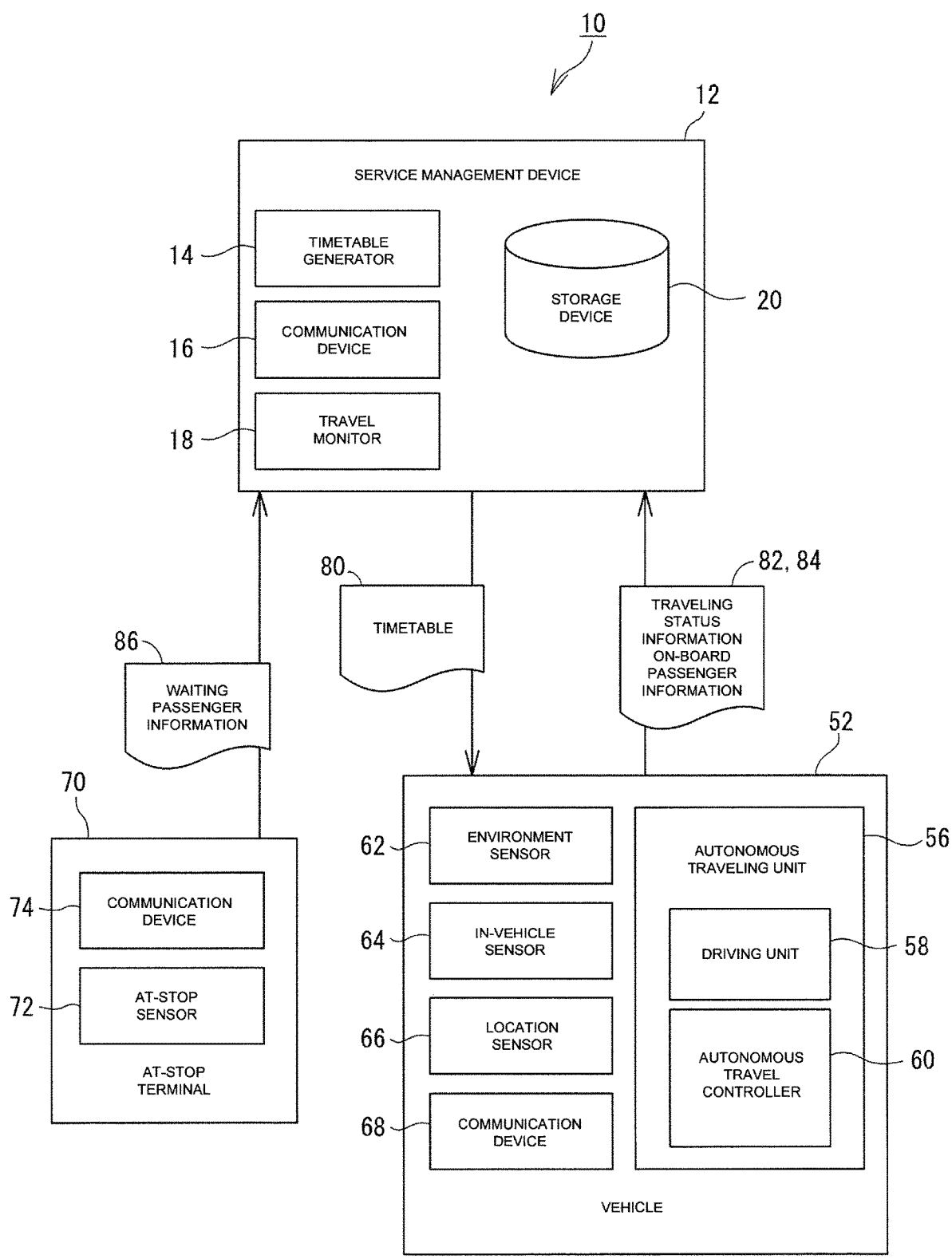
FIG. 2 is a block diagram of a transportation system.
Figure 3:
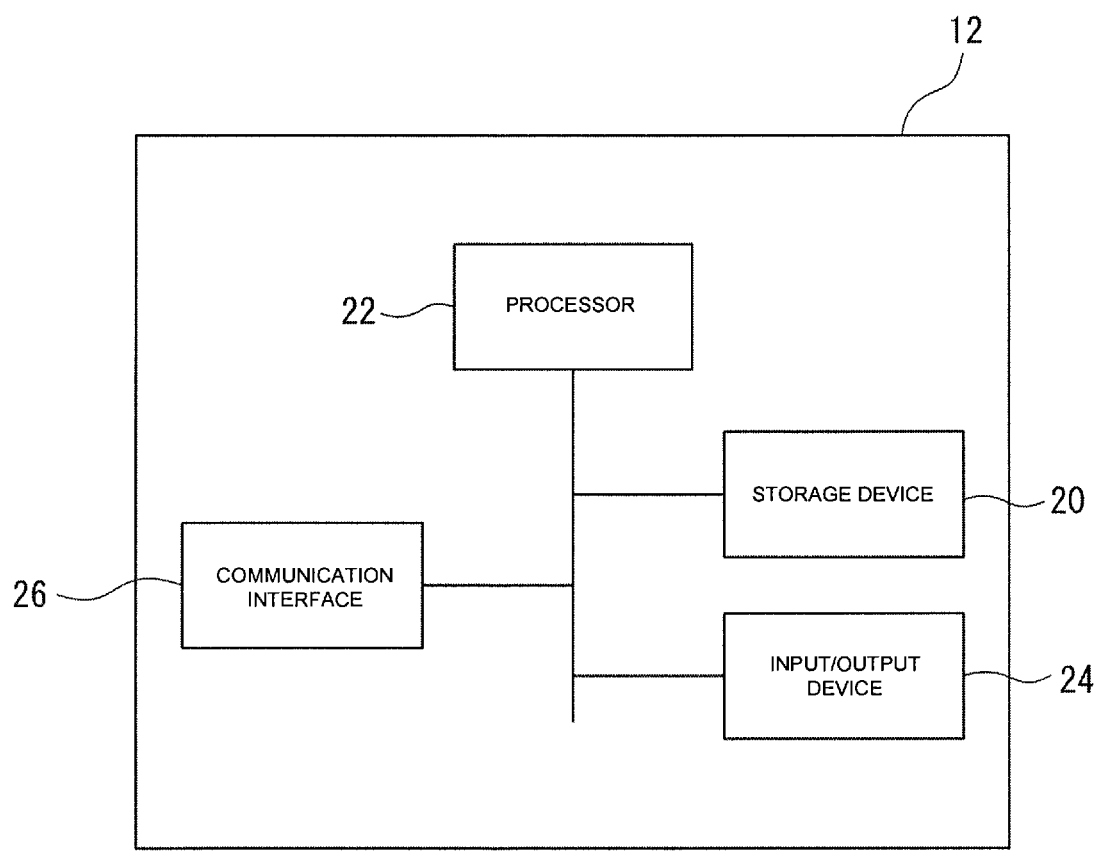
FIG. 3 is a block diagram showing a physical configuration of a service management device.

The configuration of a transportation system 10 according to an embodiment of the present disclosure is described below with reference to the attached drawings. FIG. 1 is an illustration of the transportation system 10, FIG. 2 is a block diagram of the transportation system 10, and FIG. 3 is a block diagram showing a physical configuration of a service management device 12.

The transportation system 10 is a system used to transport an unspecified number of passengers along a preset traveling route 50. The transportation system 10 includes stops 54a to 54d along the traveling route 50 and multiple vehicles 52A to 52D that can autonomously travel along the traveling route 50. In the description below, when there is no need to distinguish the individual vehicles, the vehicles 52A to 52D are simply referred to as a "vehicle 52" without the letter at the end. Similarly, the stops 54a to 54d are simply referred to as a "stop 54" where appropriate.

The multiple vehicles 52 circulate the traveling route 50 in the same direction to form a chain of vehicles. The vehicles 52 temporarily stop at the respective stops 54. Passengers get on or off the vehicle 52 when the vehicle 52 temporarily stops. In the present embodiment, the vehicles 52 are used as buses that transport an unspecified number of passengers from a stop 54 to another stop 54. The service management device 12 (not shown in FIG. 1; refer to FIGS. 2 and 3) controls travel of the vehicles 52. In the present embodiment, the service management device 12 controls the vehicles 52 to travel at equal intervals, that is, the intervals between the departures of the vehicles 52 at the respective stops 54 are equal to each other. In such an equal interval service, for example, when the intervals between departures are five minutes at the stop 54a, the intervals between departures at the other stops are also five minutes.

Each element of the transportation system 10 is described in more detail below. The vehicles 52 autonomously travel in accordance with a timetable 80 supplied by the service management device 12. The timetable 80 defines a service schedule of the vehicles 52. In the present embodiment, as described in more detail below, the timetable 80 shows departure and arrival times at the respective stops 54a to 54d. To depart from or arrive at the stops 54a to 54d as scheduled by the timetable 80, the vehicles 52 autonomously travel. Specifically, to travel as scheduled, the vehicles 52 themselves make decisions, such as the travel speed between the stops, whether or not to stop at signals, and whether or not to overtake other vehicles.

As shown in FIG. 2, each of the vehicles 52 includes an autonomous traveling unit 56 which has two main units, namely, a driving unit 58 and an autonomous travel controller 60. The driving unit 58 is a basic unit to move the vehicles 52 and includes, for example, a prime mover, a powertrain, a brake, a running gear, a suspension, and a steering device. The autonomous travel controller 60 controls the driving unit 58 to enable autonomous travel of the vehicle 52. The autonomous travel controller 60 is a computer which includes, for example, a processor and a memory. The term "computer" here includes a microcontroller which is a computer system embedded in a single integrated circuit. The term "processor" refers to a processor in a broad sense, including general-purpose processors (such as a central processing unit (CPU)) and dedicated-purpose processors (such as a graphics processing unit (GPU), an application specific integrated circuit (ASIC), a field programmable gate array (FPGA), and a programmable logic device).

To enable autonomous travel, the vehicle 52 further includes an environment sensor 62 and a location sensor 66. The environment sensor 62 senses the peripheral environment around the vehicle 52. The environment sensor 62 may include a camera, a Lidar, a millimeter wave radar, a sonar, or a magnetic sensor. Based on the information received from the environment sensor 62, the autonomous travel controller 60 recognizes types of objects around the vehicle 52, distances from the objects, road surface markings (for example, white lines) along the traveling route 50, and traffic signs. The location sensor 66 is, for example, a GPS which senses a current location of the vehicle 52. The information from location sensor 66 is also sent to the autonomous travel controller 60 that controls the acceleration/deceleration and steering of the vehicle 52 based on the information from the environment sensor 62 and the location sensor 66. The autonomous travel controller 60 periodically checks the status of the vehicle 52 to determine whether or not to continue service. The control status determined by the autonomous travel controller 60 is sent to the service management device 12 as traveling status information 82. This traveling status information 82 includes at least the current location of the vehicle 52 and whether or not to continue service.

The vehicles 52 further includes an in-vehicle sensor 64 and a communication device 68. The in-vehicle sensor 64 is a sensor to obtain on-board passenger information 84 which includes at least the number of boarded passengers. In addition to the number of boarded passengers, the on-board passenger information 84 may include information regarding attributes of boarded passengers that would affect time required for the passengers to get on and off the vehicle 52. The attributes may include at least one of, for example, the presence or absence of a passenger using a wheelchair, a white cane, a stroller, or orthoses, and age groups of passengers. The in-vehicle sensor 64 may be, for example, a camera that captures images inside the vehicle, or a load sensor that senses total weight of the boarded passengers. The information obtained by the in-vehicle sensor 64 is sent to the service management device 12 as the on-board passenger information 84.

The communication device 68 is a device to wirelessly communicate with the service management device 12. The communication device 68 can communicate through the Internet via wireless LAN, such as WiFi®, or mobile data communication provided by a mobile phone company or other provider. The communication device 68 receives the timetable 80 from the service management device 12, and sends the traveling status information 82 and the on-board passenger information 84 to the service management device 12.

An at-stop terminal 70 is a terminal provided at each stop 54. The at-stop terminal 70 includes a communication device 74 and an at-stop sensor 72. The at-stop sensor 72 is a sensor that obtains waiting passenger information 86 that includes at least the number of passengers waiting for the vehicle 52 at the stop 54. In addition to the number of waiting passengers, the waiting passenger information 86 may include information regarding attributes of waiting passengers that would affect time required for the passengers to get on and off the vehicle 52. The attributes may include at least one of, for example, the presence or absence of a passenger using a wheelchair, a white cane, a stroller, or other support devices and age groups of passengers. The at-stop sensor 72 may be, for example, a camera that captures images of the stop 54, or a load sensor or the like that senses a total weight of waiting passengers. The information obtained by the at-stop sensor 72 is sent to the service management device 12 as the waiting passenger information 86. The communication device 74 is provided to enable the transmission of the waiting passenger information 86.

The service management device 12 monitors the traveling status of the vehicle 52 and controls the vehicle 52 in accordance with the traveling status. Physically, the service management device 12 is a computer that includes a processor 22, a storage device 20, an input/output device 24, and a communication interface 26, as shown in FIG. 3. The term "processor" indicates a processor in a broad meaning, including a general-purpose processor (such as a CPU) and a dedicated-purpose processor (such as a GPU, ASIC, FPGA, and a programmable logic device). The storage device 20 may include at least one of a semiconductor memory (for example, a RAM, a ROM, and a solid-state drive) and a magnetic disc (for example, a hard disk drive). Although the service management device 12 is shown as a single computer in FIG. 3, the service management device 12 may be configured with multiple computers which are physically separated.

Functionally, the service management device 12 includes a timetable generator 14, a communication device 16, a travel monitor 18, and the storage device 20, as shown in FIG. 2. The timetable generator 14 generates the timetable 80 for each of the vehicles 52. The timetables 80 are generated such that the service intervals between the vehicles 52 are equal to a preset target service intervals.

The communication device 16 is a device to wirelessly communicate with the vehicles 52. The communication device 16 can communicate through the Internet via WiFi®, or mobile data communication. The communication device 16 sends the timetables 80 which have been generated or regenerated by the timetable generator 14 to the vehicles 52, and receives the traveling status information 82 and the on-board passenger information 84 from the vehicles 52 and the waiting passenger information 86 from the at-stop terminal 70. In the description below, the on-board passenger information 84 and the waiting passenger information 86 are referred to collectively as "passenger information".

The travel monitor 18 obtains the traveling status of each of the vehicles 52 based on the traveling status information 82 sent from the vehicles 52. As described above, the traveling status information 82 includes the current location of the vehicle 52. The travel monitor 18 compares the location of the vehicle 52 and the timetable 80 to obtain information, such as an amount of delay of the vehicle 52 from the timetable 80 and the service intervals between the vehicles 52.

Figure 4:
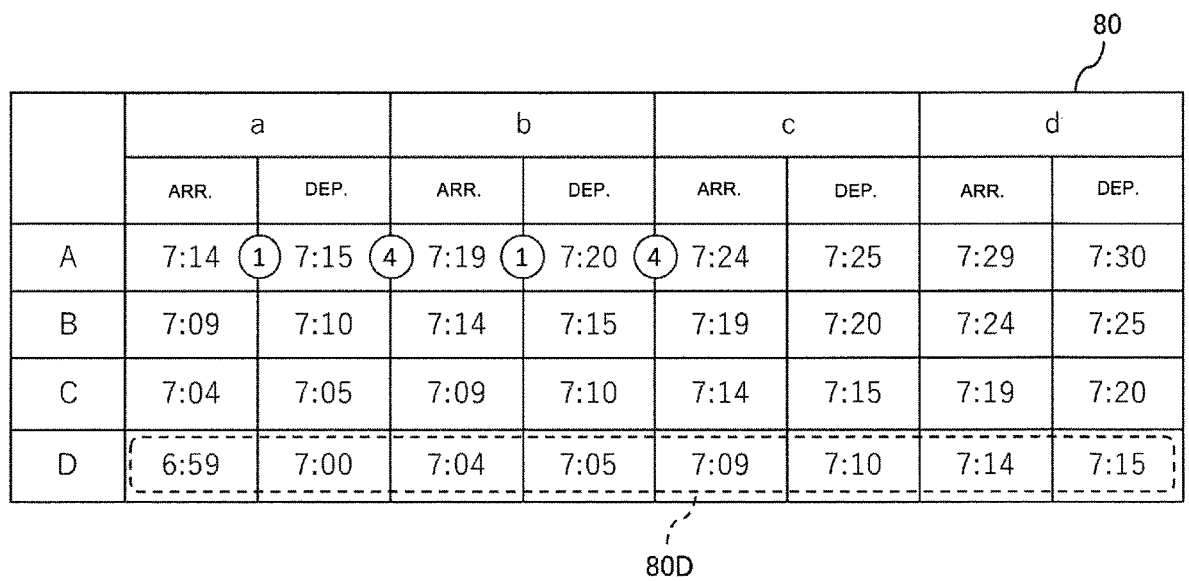
FIG. 4 is an example of a timetable used in the transportation system in FIG. 1.

Generation of the timetable 80 by the service management device 12 is described below. FIG. 4 shows an example of the timetable 80 used in the transportation system 10 in FIG. 1. The embodiment shown in FIG. 1 includes a chain of four vehicles 52A to 52D and four stops 54a to 54d separated at equal intervals along the traveling route 50. In the present embodiment, the time required for each of the vehicles 52 to travel once around the traveling route 50, in other words, a round-trip time TC, is assumed to be 20 minutes.

In such a case, the service management device 12 generates the timetable 80 such that the interval between the departures of the vehicles 52 at the stops 54 is five minutes, which is the round-trip time TC divided by the number N of vehicles 52 (20/4=5). The timetable 80 defines departure and arrival times at the stops 54. For example, the timetable 80D that is sent to the vehicle 52D defines target times at which the vehicle 52D arrives at and departs from the stops 54a to 54d.

The timetable 80 may be sent periodically or when a certain event occurs. For example, the timetable 80 may be sent from the service management device 12 to each of the vehicles 52 when the vehicle 52 arrives at a certain stop, for example, the stop 54a. Alternatively, the timetable 80 may be sent when a certain event occurs, such as when the vehicle 52 has a breakdown or is delayed. In response to receiving a new timetable 80, the vehicle 52 discards the stored timetable 80 and travels in accordance with the received new timetable 80. The timetable 80 may include a schedule for one or more stops. For example, the timetable 80 may define a time schedule for the entire one round along the traveling route 50.

Figure 5:
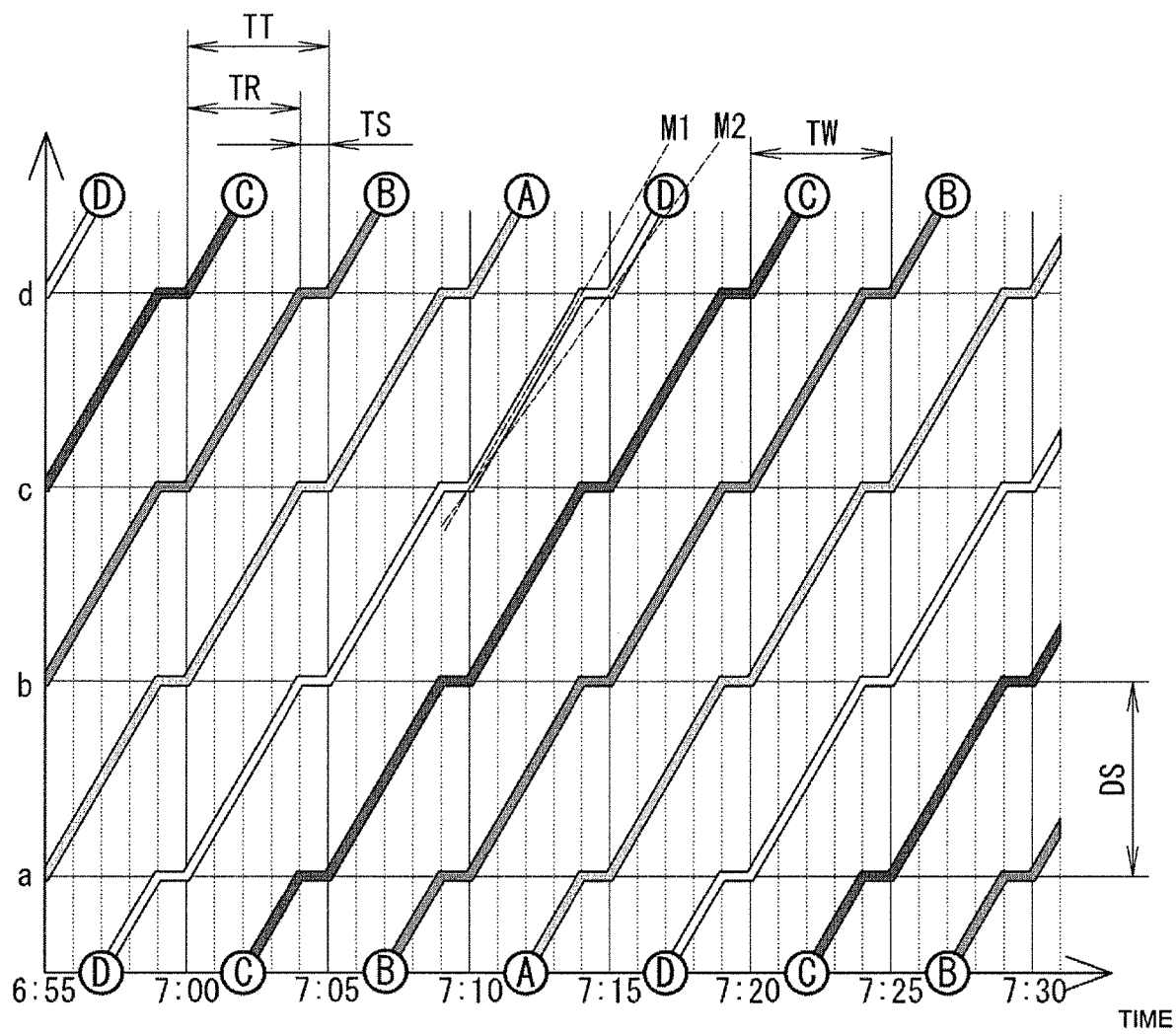
FIG. 5 is a service timing chart of vehicles that autonomously travel according to the timetable shown in FIG. 4.

The vehicle 52 autonomously travels in accordance with the received timetable 80. FIG. 5 shows a service timing chart of the vehicles 52A to 52D which autonomously travel in accordance with the timetable 80 in FIG. 4. In FIG. 5, the horizontal axis shows time, while the vertical axis shows the location of the vehicles 52. Before describing the traveling status of the vehicles 52, the parameters used in the description below are briefly described.

In the description below, the distance from one of the stops 54 to the next stop 54 is referred to as a "distance between stops DS". The period of time between the departure of the vehicle 52 from the one of the stops 54 and the departure of the vehicle 52 from the next stop 54 is referred to as "time required between stops TT"; and the period of time during which the vehicle 52 waits at the stop 54 for passengers to get on and off the vehicle 52, is referred to as "dwell time TS". The period of time from a departure from one of the stops 54 to an arrival at the next stop 54, in other words, the time period obtained by subtracting the dwell time TS from the time required between stops TT, is referred to as "travel time between stops TR".

The value obtained by dividing a traveling distance by a travel time period including the dwell time TS is referred to as a "scheduled speed VS", whereas the value obtained by dividing the traveling distance by a travel time period excluding the dwell time TS is referred to as "average speed VA". In FIG. 5, the inclination of line M1 represents the average speed VA, whereas the inclination of line M2 represents the scheduled speed VS. The scheduled speed VS is inversely proportional to the time required between stops TT.

Traveling of the vehicle 52 is described below with reference to FIG. 5. According to the timetable 80 shown in FIG. 4, the vehicle 52A departs the stop 54a at 7:15. Four minutes later, the vehicle 52A arrives at the stop 54b at 7:19, stays at the stop 54b for one minute, and departs from the stop 54b at 7:20. The vehicle 52A controls the average speed VA to finish traveling from the stop 54a to the stop 54b in the four minutes from 7:15 to 7:19.

Normally, the timetable generator 14 generates the timetable 80 such that the dwell time of each vehicle 52 at the stop 54 equals to a preset scheduled dwell time TSp. In the embodiment shown in FIG. 5, the scheduled dwell time TSp is one minute. The scheduled dwell time TSp is set to allow a sufficient boarding and alighting time for passengers.

However, depending on passenger conditions, the passengers may not finish getting on and off the vehicle 52 within the scheduled dwell time TSp. For example, when a large number of passengers get on at one of the stops 54, because extra time may be required, the boarding and alighting time may exceed the scheduled dwell time TSp. Even when the number of boarding passengers is not high, the boarding and alighting time may still exceed the scheduled dwell time TSp when a passenger requires extra time, such as when a passenger uses a wheelchair or accompanies a child.

When the boarding and alighting time exceeds the scheduled dwell time TSp, the departure of the vehicle 52 may be delayed for the exceeded period, resulting in a delay from the timetable 80. Such a delay causes a longer traveling time for the passengers or crowd in the delayed vehicle 52 due to concentration of passengers. The timetable generator 14 calculates the boarding and alighting time estimate TEE based on the on-board passenger information 84 sent from the vehicle 52 and the waiting passenger information 86 sent from the stop 54. When the boarding and alighting time estimate TEE exceeds a preset tolerable boarding and alighting time TEdef, the timetable generator 14 generates the timetable 80 in which a higher average speed VA between the stops and a longer dwell time TS at the stops 54 are set for a longer boarding and alighting time estimate TEE. This process is described below.

First, a method to calculate the boarding and alighting time estimate TEE is described. The boarding and alighting time estimate TEE is calculated for each vehicle 52 at each stop 54. The calculation method of the boarding and alighting time estimate TEE is not limited to any type as long as the boarding and alighting time estimate TEE is calculated based on at least one of the on-board passenger information 84 and the waiting passenger information 86. For example, the overall alighting time of a certain vehicle 52 may be calculated by obtaining the alighting time of each of the passengers on the vehicle 52 based on the passenger's attributes, and calculating the total of the obtained alighting times. The overall alighting time of the vehicle 52 obtained in this manner may be divided for each stop at predetermined ratios and the divided value may be used as the alighting time when the vehicle 52 arrives at the stop 54. For example, the ratio of the alighting time at the four stops 54a to 54d may be assumed to be 1:1:2:1 based on past service records. The alighting time of the vehicle 52A at the stop 54a can be calculated from an formula Ta×⅕ where Ta is the overall alighting time of the vehicle 52A.

The waiting passenger information 86 may be periodically sent to the service management device 12 from the at-stop terminal 70. In such a case, the timetable generator 14 may periodically estimate the boarding time at the stop 54 based on the number and the attributes of passengers at the stop 54, and obtain a value for the increase in the boarding time per unit time such that the timetable generator 14 can generate, based on the obtained increase value, the time required for boarding of the passengers at the time the vehicle 52 is expected to arrive at the stop 54. For example, when the number of passengers waiting at the stop 54a increases by one each minute and the boarding time of each passenger is assumed to be six seconds, the increase of the boarding time per one minute is six seconds. When a vehicle 52 departs from the stop 54a every five minutes, the number of additional passengers arriving during the period from the departure of the vehicle 52 to the departure of the next vehicle 52 can be estimated to be five. Accordingly, the boarding time required for the next vehicle 52 at the stop 54a can be estimated by a formula 6×5=30 (seconds).

According to another embodiment, the timetable generator 14 may include a simulator which virtually simulates boarding and alighting of passengers. In such a case, the timetable generator 14 may input at least one of the on-board passenger information 84 and the waiting passenger information 86 to the simulator to obtain the boarding and alighting time estimate TEE of the designated vehicle 52 at the designated stop 54 based on the simulation.

The boarding and alighting time estimate TEE obtained in a single calculation may be for a single stop or multiple stops. In general, the number of stops for which the boarding and alighting time estimate TEE is obtained may be the same as the number of stops recorded in the timetable 80. For example, when the timetable 80 of the vehicle 52A includes the timetables for four stops, the timetable generator 14 obtains the boarding and alighting time estimate TEE of the vehicle 52A at the respective four stops at a timing to generate the timetable 80.

After the boarding and alighting time estimate TEE is obtained, the timetable generator 14 compares the obtained boarding and alighting time estimate TEE with the preset tolerable boarding and alighting time TEdef, which can maintain the dwell time TS within the scheduled dwell time TSp. For example, the tolerable boarding and alighting time TEdef may be a time period obtained by subtracting, from the scheduled dwell time TSp, a safety confirmation time required before and after boarding and alighting of passengers.

When the boarding and alighting time estimate TEE is equal to or less than the tolerable boarding and alighting time TEdef, the timetable generator 14 sets the dwell time TS at the stop 54 to the scheduled dwell time TSp regardless of the boarding and alighting time estimate TEE. Such a setting can prevent an excessive slowing of the average speed VA between the stops. Otherwise, with the same departure timing of the vehicle 52, a lower average speed VA is set for a shorter dwell time TS. As an overly slow average speed VA would disturb traveling of the other vehicles 52, the timetable generator 14 can prevent the excessive slowing of the average speed VA by setting the dwell time TS to the scheduled dwell time TSp when the boarding and alighting time estimate TEE is less than a certain value.

In contrast, when the boarding and alighting time estimate TEE exceeds the tolerable boarding and alighting time TEdef, the timetable generator 14 generates the timetable 80 such that a higher average speed VA between the stops and a longer dwell time TS at the stops 54 are set for a longer boarding and alighting time estimate TEE.

For example, a case is described below in which the number of waiting passengers is high, resulting in the boarding and alighting time estimate TEE at the stop 54c to be one minute longer than the tolerable boarding and alighting time TEdef. In such a case, as shown in FIG. 6, the timetable generator 14 generates a timetable 80 such that every vehicle 52 arrives at the stop 54c two minutes before the scheduled departure time.

Figure 6:
FIG. 6 is another example of a timetable used in the transportation system in FIG. 1.
Figure 7:
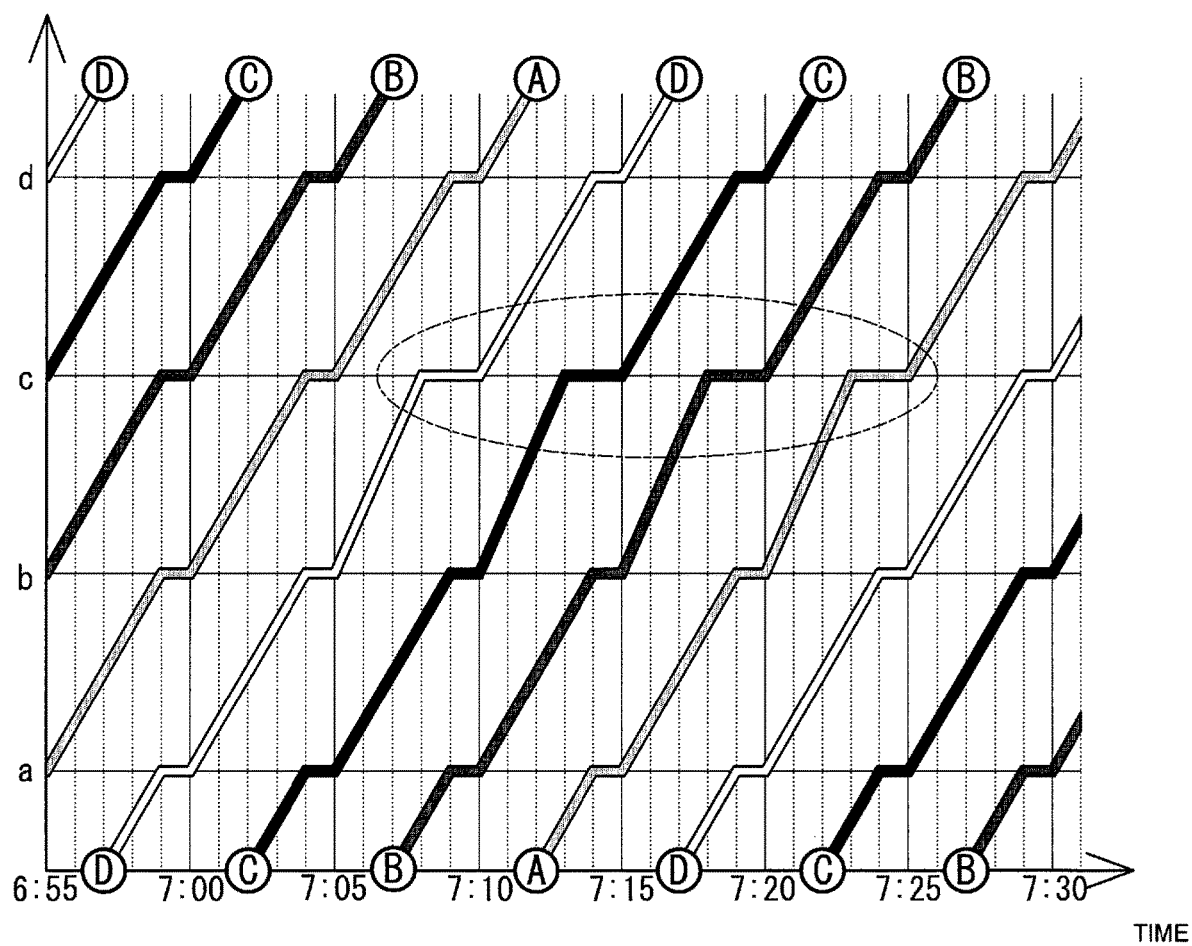
FIG. 7 is a service timing chart of vehicles that autonomously travel according to the timetable shown in FIG. 6.

FIG. 7 shows a travel timing chart of the vehicles 52 which travel in accordance with the timetable 80 shown in FIG. 6. When the timetable 80 defines that the vehicles 52 arrive two minutes before the scheduled departure time as shown in FIG. 7, the average speed VA between the stop 54b and the stop 54c is set to be higher than the average speed VA between the other stops to depart as scheduled by the timetable 80. Accordingly, all vehicles 52 arrive at the stop 54c two minutes before the scheduled departure time and the dwell time TS at the stop 54c is two minutes. Potential delay of the vehicles 52 from the scheduled departure time can be effectively prevented by making the dwell time TS sufficiently long.

Figure 8:
FIG. 8 is an example of a timetable in which departure times are shifted later.

Note that in order to obtain sufficient dwell time TS, it would also be possible to set a delayed departure time instead of an earlier arrival time. For example, as shown in FIG. 8, the timetable 80 could be arranged to delay the departure time at the stop 54c by one minute and the arrival at the stop 54c two minutes earlier than in the case shown in FIG. 4.

Figure 9:
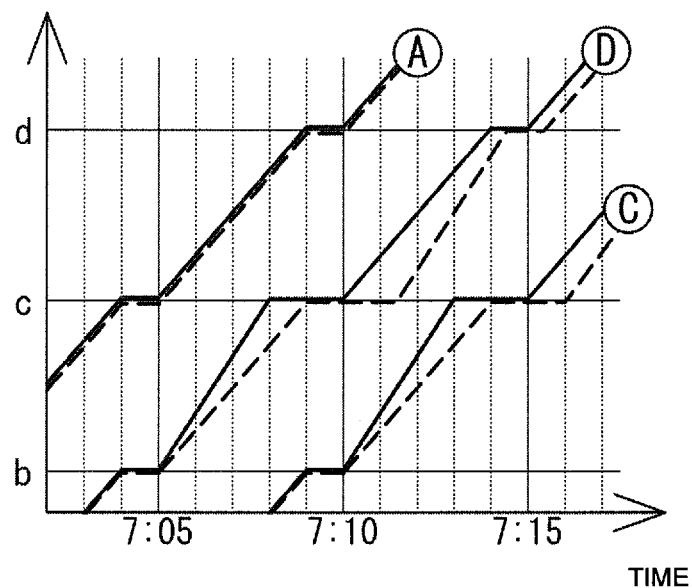
FIG. 9 is diagrams showing the locations of vehicles and the number of waiting passengers that change over time around 7:10.
Figure 9:
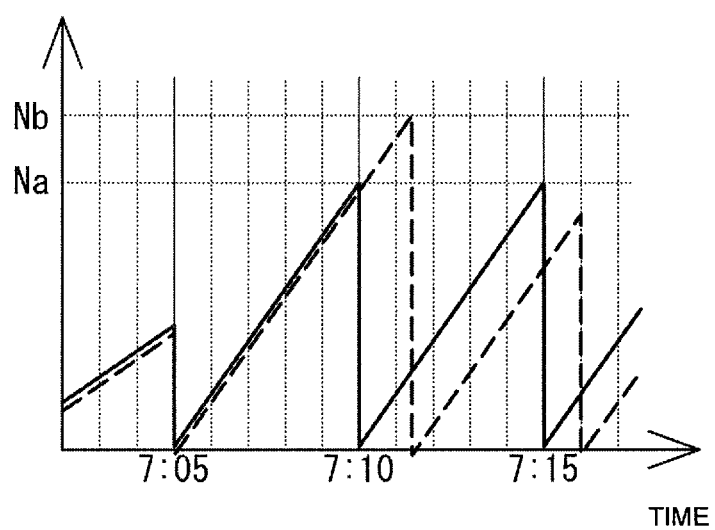

However, in such a case, passengers could be concentrated at the vehicles 52 which were delayed from the schedule departure time due to a longer time required for boarding and alighting of passengers, in turn increasing the likelihood of a still longer delay from the timetable 80. This situation is described with reference to FIG. 9, which shows changes over time around 7:10 in the location of the vehicles 52 and the number of waiting passengers at the stop 54c. In FIG. 9, the upper graph shows the location of the vehicles 52A, 52D, and 52C; and the lower graph shows the number of passengers waiting at the stop 54c. The solid lines in FIG. 9 show the locations and the number of passengers waiting for the vehicle 52D when the vehicle 52D travels in accordance with the timetable 80 in FIG. 6, whereas the broken lines illustrate when the vehicle 52D travels in accordance with the timetable 80 in FIG. 8.

As shown in the lower graph in FIG. 9, the number of passengers waiting at the stop 54c is zero immediately after the departure of the vehicle 52, and then increases over time and becomes zero again when another vehicle 52 departs from the stop 54c. For the purpose of simplifying description, the number of passengers is assumed to increase directly proportional to time.

The vehicle 52D is assumed to arrive at the stop 54c on time at 7:08 in accordance with the timetable 80 in FIG. 6. In such a case, the passengers who arrive at the stop 54c during the 5-minute interval between the departure of the vehicle 52A and the departure of the vehicle 52D will board the vehicle 52D. As shown by the solid line in FIG. 9, the number of passengers who board the vehicle 52D at the stop 54c is assumed to be Na and the passengers are assumed to complete boarding and alighting of the vehicle 52D within the dwell time of 2 minutes.

Alternatively, the vehicle 52D is now assumed to arrive at the stop 54c at 7:09 in accordance with the timetable 80 in FIG. 8. Because the time period between the departure of the vehicle 52A and the departure of the vehicle 52D is now 6 minutes, the number of passengers waiting for the vehicle 52D increases corresponding to one minute in comparison with a case as illustrated in the timetable 80 of FIG. 6. As illustrated by broken lines in FIG. 9, because the number of passengers who board the vehicle 52D at the stop 54c is greater than Na, the time period required for the passengers to get on and off the vehicle 52D is longer than in a case in accordance with the timetable 80 in FIG. 6. As a result, the passengers may not finish getting on and off the vehicle 52D within two minutes. In such a case, because the time allowed for the vehicle 52D to reach the next stop 54d becomes shorter, the likelihood of the vehicle 52D delaying from the timetable 80 increases.

As apparent from the above description, by obtaining the dwell time TS, not by shifting the departure time backward but by shifting the arrival time forward as in the present embodiment, concentration of passengers to a single vehicle 52 can be suppressed, and thus the delay from the timetable 80 can be effectively prevented.

Figure 10:
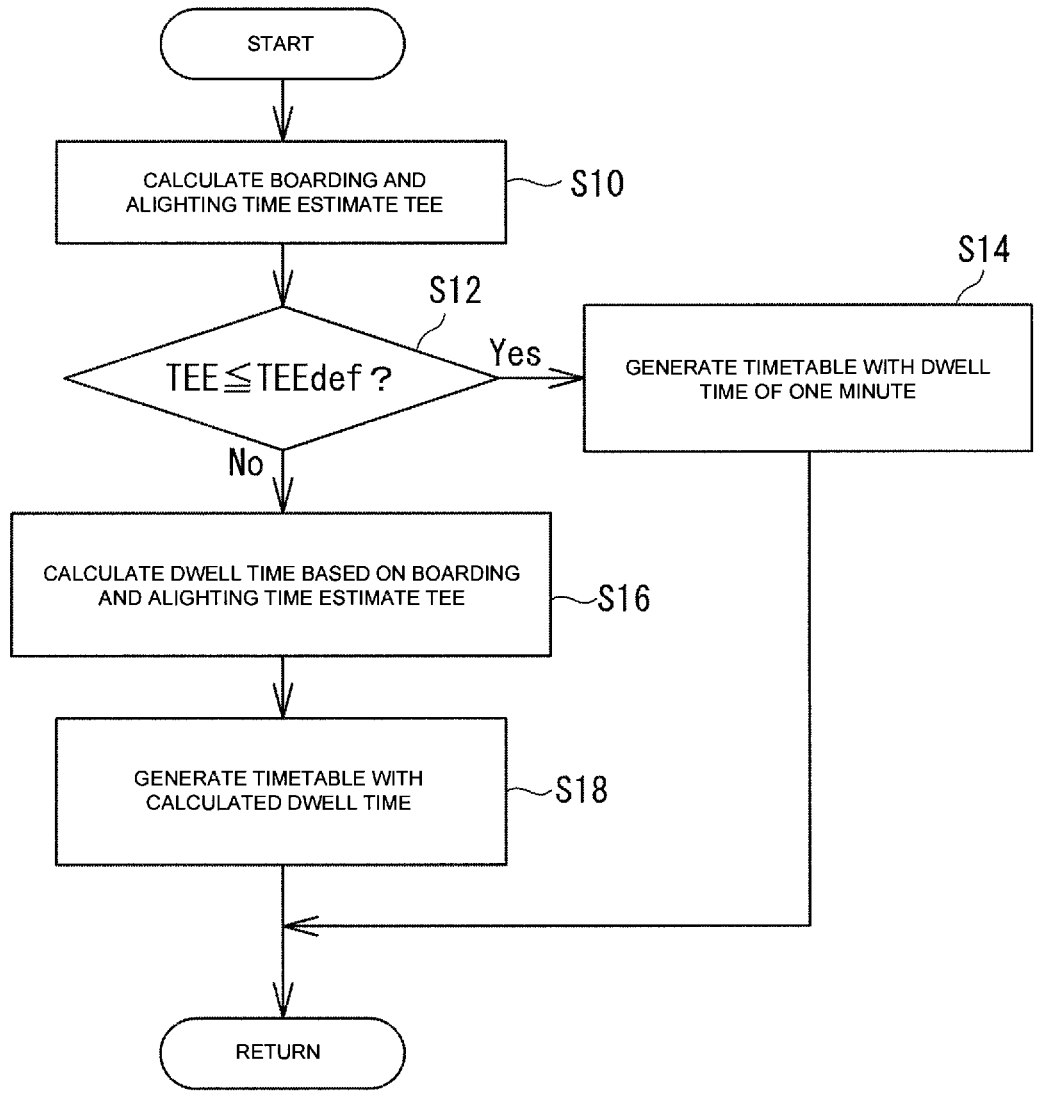
FIG. 10 is a flowchart showing steps to generate a timetable performed by a timetable generator.

With reference to FIG. 10, a flow of generation processes of the timetable 80 performed by the timetable generator 14 is described below. FIG. 10 shows a flow to generate a timetable for one of the vehicles 52 to travel to one of the stops 54. The timetable generator 14 generates the timetable 80 by performing the process shown in FIG. 10 for every vehicles 52 and every stops 54.

The timetable generator 14 calculates the boarding and alighting time estimate TEE of the vehicle 52 at the stop 54 based on the on-board passenger information 84 of the designated vehicle 52 and the waiting passenger information 86 of the designated stop 54 (S10). The timetable generator 14 then compares the obtained boarding and alighting time estimate TEE and the tolerable boarding and alighting time TEdef (S12). When the comparison finds TEE≤TEdef (yes in S12), the timetable generator 14 generates the timetable 80 by setting the dwell time TS of the vehicle 52 at the stop 54 to the scheduled dwell time TSp, that is, one minute (S14). In the present embodiment, the vehicle 52 automatically sets the dwell time TS to the scheduled dwell time TSp by designating only the departure time in the timetable 80 as shown in FIG. 4.

In contrast, when TEE>TEdef (no in S12), the timetable generator 14 calculates a suitable dwell time TS based on the obtained boarding and alighting time estimate TEE (S16). For example, the dwell time TS can be obtained by adding safety confirmation time required before and after the boarding and alighting of the passengers to the boarding and alighting time estimate TEE. Once the dwell time TS is obtained, the timetable generator 14 generates the timetable 80 using the obtained dwell time TS (S18). Specifically, the time obtained by shifting the departure time forward for the dwell time TS is set as the arrival time in the timetable 80.

In the event of vehicle trouble such as vehicle 52 becoming disabled or unable to continue operation, the timetable generator 14 may calculate the boarding and alighting time estimate TEE of the vehicle 52 following the disabled vehicle 52 including consideration of the on-board passenger information 84 of the disabled vehicle 52. This is described in more detail below.

Figure 11:
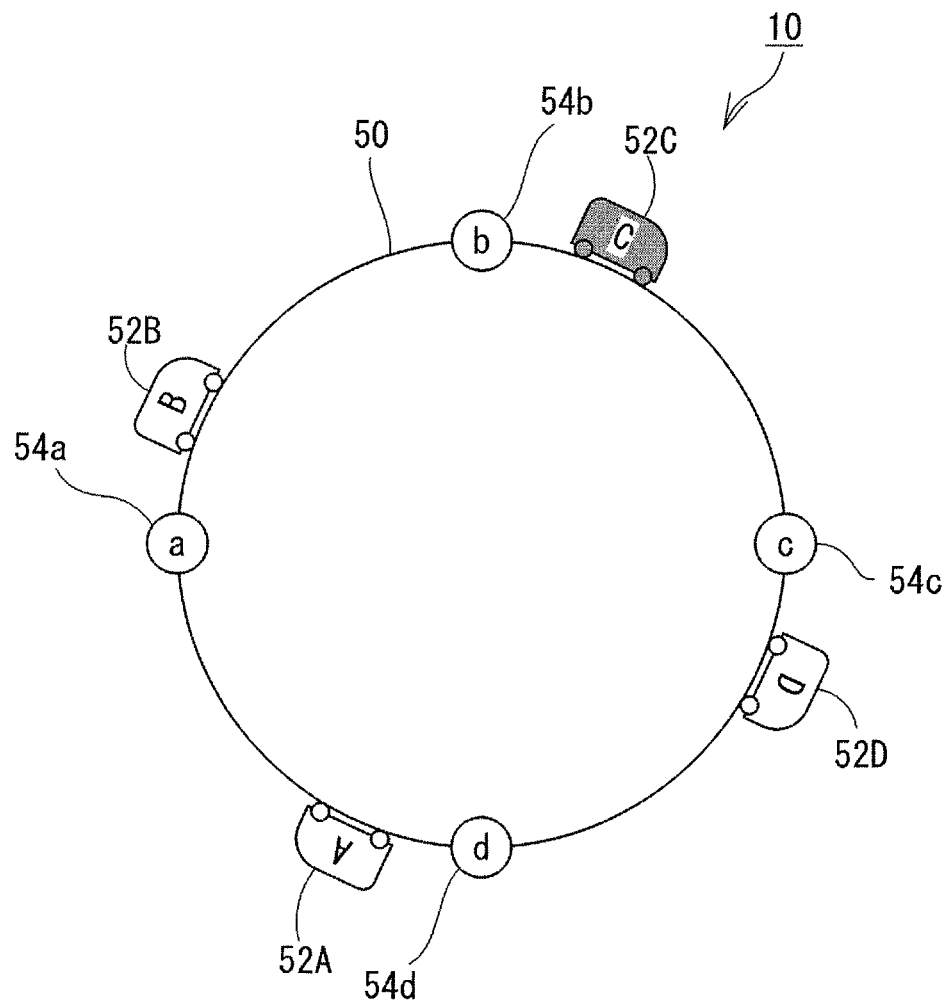
FIG. 11 is an image with a disabled vehicle.

FIG. 11 shows an image in which the vehicle 52C becomes disabled between the stop 54b and the stop 54c. When the vehicle 52C becomes disabled or unable to continue operation, the vehicle 52C sends, as a part of traveling status information 82, alarm information indicating the situation to the service management device 12. This alarm information may include description of the problem that has occurred to the vehicle 52C.

When the timetable generator 14 determines that the vehicle 52C has become disabled based on the traveling status information 82 including the alarm information, the timetable generator 14 calculates the boarding and alighting time estimate TEE of the vehicle 52B following the disabled vehicle 52C by taking account of the on-board passenger information 84 of the disabled vehicle 52C.

Specifically, when the vehicle 52C becomes disabled, the timetable generator 14 first determines based on the alarm information whether the vehicle 52C is capable of traveling to the stop 54c. If so, the timetable generator 14 causes the vehicle 52C to travel to the stop 54c. In such a case, the passengers on the vehicle 52C get off the vehicle 52C at the stop 54c and transfer to the vehicle 52B following the vehicle 52C. When the vehicle 52B arrives at the stop 54c, in addition to the alighting time for the passengers on the vehicle 52B and the boarding time of the passengers waiting at the stop 54c, the boarding time of the passengers who have alighted from the vehicle 52C is also required.

In such a case, the timetable generator 14 calculates the boarding and alighting time estimate TEE1 of the vehicle 52B at the stop 54c based on the on-board passenger information 84 of the vehicle 52B, the waiting passenger information 86 at the stop 54c, and the on-board passenger information 84 of the vehicle 52C. Because of the additional boarding time of the passengers of the vehicle 52C, the boarding and alighting time estimate TEE1, that is, the dwell time TS, of the vehicle 52B at the stop 54c becomes longer than the time estimated before the vehicle 52 becomes disabled. Because of the longer dwell time TS, the travel time between the stops becomes shorter and thus the average speed VA becomes higher than that before the vehicle 52 becomes disabled.

Alternatively, the vehicle 52C may be incapable of traveling to the next stop 54c. In such a case, the passengers of the vehicle 52C must get off the vehicle 52C at the location where the vehicle 52C has stopped (hereinafter referred to as "temporary stop"). To pick up these passengers who have alighted from the vehicle 52C, the timetable generator 14 generates the timetable 80 in which the following vehicle 52B stops at the temporary stop to pick up the passengers who have got off the vehicle 52C. In order to determine the dwell time TS, the timetable generator 14 calculates the boarding and alighting time estimate TEE2 at the temporary stop based on the on-board passenger information 84 of the vehicle 52C. When the passengers of the disabled vehicle 52C get on the following vehicle 52B at the temporary stop, the number of passengers who get off the vehicle 52B at the stop 54c may increase, resulting in a longer boarding and alighting time estimate TEE1. Also in this case, the timetable generator 14 calculates the boarding and alighting time estimate TEE1 of the following vehicle 52B at the stop 54c based on the on-board passenger information 84 of the following vehicle 52B, the waiting passenger information 86 at the stop 54c, and the on-board passenger information 84 of the disabled vehicle 52C. The timetable generator 14 calculates the dwell time TS at the temporary stop and the stop 54c based on the obtained boarding and alighting time estimates TEE1 and 2, and generates the timetable 80 in accordance with the obtained dwell time TS.

Figure 12:
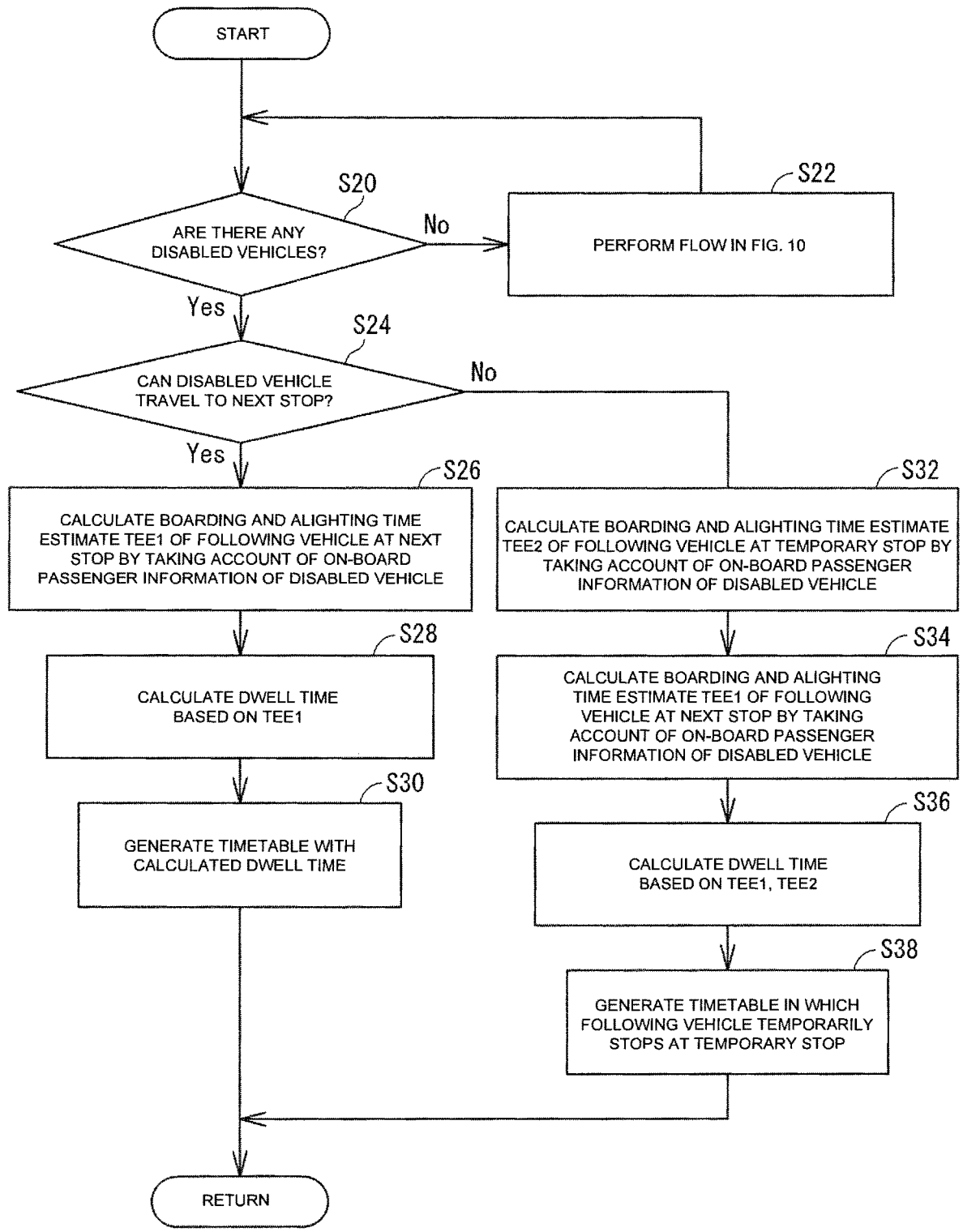
FIG. 12 is a flowchart showing steps with the disabled vehicle in consideration performed by the timetable generator.

FIG. 12 is a flowchart which shows a process flow of the timetable generator 14 in consideration of such a disabled vehicle 52. As shown in FIG. 12, the timetable generator 14 periodically checks for existence and absence of any disabled vehicle 52 (S20). When the timetable generator 14 finds no disabled vehicle 52 (no in S20) at a result of the checking, the timetable generator 14 performs the flow shown in FIG. 10 (S22).

In contrast, when a disabled vehicle 52 is found (yes in S20), the timetable generator 14 analyzes the alarm information included in the traveling status information 82 to determine whether the disabled vehicle 52 is capable of traveling to the next stop 54 (S24). When the timetable generator 14 determines that the disabled vehicle 52 is capable of traveling to the next stop 54 (yes in S24), the timetable generator 14 calculates the boarding and alighting time estimate TEE1 of the vehicle 52 following the disabled vehicle 52 at the next stop 54 based on the on-board passenger information 84 of the following vehicle 52, the waiting passenger information 86 at the next stop 54, and the on-board passenger information 84 of the disabled vehicle 52 (S26). The timetable generator 14 then calculates the dwell time TS of the following vehicle 52 at the next stop 54 (S28) based on the obtained boarding and alighting time estimate TEE1, and generates the timetable 80 of the following vehicle 52 using the obtained dwell time TS (S30).

In contrast, when the disabled vehicle 52 is not capable of traveling to the next stop 54 (no in S24), the timetable generator 14 calculates the boarding and alighting time estimate TEE2 of the following vehicle 52 at the temporary stop where the disabled vehicle 52 stopped while considering the on-board passenger information 84 of the disabled vehicle 52 (S32). The timetable generator 14 generates the boarding and alighting time estimate TEE1 of the following vehicle 52 at the next stop 54 based on the on-board passenger information 84 of the following vehicle 52, the waiting passenger information 86 at the next stop 54, and the on-board passenger information 84 of the disabled vehicle 52 (S34). The timetable generator 14 then obtains the dwell time TS of the vehicle 52 at the temporary stop and the next stop 54 based on the obtained boarding and alighting time estimates TEE1 and 2 (S36) to generate the timetable 80 of the following vehicle 52 using the obtained dwell time TS (S38). After completing these steps, the timetable generator 14 returns to step S20 and repeats the steps.

As apparent from the above description, in the present embodiment, when any one of the vehicles 52 becomes disabled, the boarding and alighting time estimate TEE of the following vehicle 52 is calculated while taking into account the on-board passenger information 84 of the disabled vehicle 52. By determining the dwell time TS of the following vehicle 52 based on the obtained boarding and alighting time estimate TEE, sufficient time required for the passengers of the disabled vehicle 52 to transfer to the following vehicle 52 can be allowed.

When the vehicle 52 becomes disabled and is not returned to service, it may not be possible to sufficiently fulfill a transportation demand. Although not shown in flowchart in FIG. 12, the timetable generator 14 may address such circumstances by generating a timetable 80 which excludes the disabled vehicle 52 from the chain of vehicles and adds a new vehicle 52 to the chain of vehicles when available.

The above described configurations are merely examples. The configurations may be changed as required as long as the timetable 80 is generated such that the boarding and alighting time estimate TEE of the vehicle 52 at the stop 54 is calculated based on at least one of the on-board passenger information 84 and the waiting passenger information 86 (that is, passenger information), and a higher average speed VA between the stops and a longer dwell time TS are set for a longer boarding and alighting time estimate TEE. For example, in the above embodiments, when the boarding and alighting time estimate TEE is equal to or less than the tolerable boarding and alighting time TEdef, the dwell time TS is set to the scheduled dwell time TSp. However, the dwell time TS may be changed in accordance with the boarding and alighting time estimate TEE even when TEE≤TEdef.

The boarding and alighting time estimate TEE may be calculated while taking account of other information in addition to at least one of the on-board passenger information 84 and the waiting passenger information 86. For example, when reserved travel on the vehicle 52 is available, the status of reservation may be used to calculate the boarding and alighting time estimate TEE. Further, other information such as day of week and time of day, and events around the stops may also be used to calculate the boarding and alighting time estimate TEE. Although the timetable 80 defines the arrival time at the stops 54 in the present embodiment, the average speed VA between the stops may be defined instead of or in addition to the arrival time. Further, the number of and the distances between the vehicles 52 or of the stops 54 may be changed as required. In particular, the intervals set between the vehicles 52 need not be uniform.

The invention claimed is:

1. A transportation system comprising:
a traveling route along which a plurality of stops are set;
a chain of a plurality of vehicles configured to autonomously travel along the traveling route; and
a service management device configured to manage traveling of the plurality of vehicles, the service management device including a processor configured to control the traveling of the plurality of vehicles, wherein the processor is configured to:
generate a timetable for each of the plurality of vehicles; and
send the timetable to the plurality of vehicles and receive passenger information about passengers of the transportation system at least from the plurality of vehicles or the plurality of stops, and
generate the timetable by calculating a boarding and alighting time estimate of each of the plurality of vehicles at each of the plurality of stops based on at least the passenger information such that a higher speed of the vehicle between the stops and a longer dwell time of the vehicle at the stop are set for a longer boarding and alighting time estimate, wherein
each of the plurality of vehicles is configured to send traveling status information that indicates a traveling status of the vehicle to the processor, and
when the processor determines, based on the traveling status information, that there is a disabled vehicle that cannot continue service, the processor calculates a boarding and alighting time estimate of a vehicle following the disabled vehicle at a next scheduled stop of the disabled vehicle based on on-board passenger information of the following vehicle, waiting passenger information at the next scheduled stop, and on-board passenger information of the disabled vehicle.

2. The transportation system according to claim 1, wherein
the processor generates the timetable such that when the boarding and alighting time estimate is equal to or less than a preset boarding and alighting time, the dwell time and the speed are set to preset values regardless of the boarding and alighting time estimate.

3. The transportation system according to claim 1, wherein
each of the plurality of vehicles comprises an in-vehicle sensor configured to obtain on-board passenger information comprising at least a number of passengers on board the vehicle and an attribute about the on-board passengers, and to send the on-board passenger information to the processor, and
the passenger information comprises the on-board passenger information.

4. The transportation system according to claim 3, wherein
the processor calculates an overall alighting time of each of the plurality of vehicles based on the on-board passenger information and calculates an alighting time estimate of the vehicle at each of the plurality of stops by dividing the calculated overall alighting time of the vehicle by preset ratios for each of the plurality of stops.

5. The transportation system according to claim 3, wherein
the attribute comprises at least one of age group or presence or absence of a passenger using a wheelchair, a white cane, an orthosis, or a stroller.

6. The transportation system according to claim 1, wherein
each of the plurality of stops comprises an at-stop sensor configured to obtain waiting passenger information comprising at least a number of waiting passengers and an attribute about the waiting passengers, and to send the waiting passenger information to the processor, and
the passenger information comprises the waiting passenger information.

7. The transportation system according to claim 6, wherein
each of the plurality of stops periodically sends the waiting passenger information to the processor, and
the processor calculates increase per unit time of boarding time of the waiting passengers at the stop based on the waiting passenger information, and further calculates a boarding time estimate for each of the plurality of vehicles at the stop based on the calculated increase per unit time.

8. The transportation system according to claim 1, wherein
when the disabled vehicle is capable of traveling to the next scheduled stop, the processor generates the timetable by assuming that the passengers on the disabled vehicle are to transfer to the following vehicle at the next scheduled stop.

9. The transportation system according to claim 1, wherein
when the disabled vehicle is not capable of traveling to the next scheduled stop, the processor generates the timetable such that, by assuming that the passengers on the disabled vehicle are to transfer to the following vehicle at a temporary stop where the disabled vehicle stopped, the following vehicle is temporarily stopped at the temporary stop.

10. A service management device comprising:
a processor configured to control travel of a plurality of vehicles, wherein the processor is configured to:
generate a timetable for each of a plurality of vehicles configured to autonomously travel along a preset traveling route; and
send the timetable to the plurality of vehicles and receive passenger information about passengers of the plurality of vehicles at least from the plurality of vehicles or the plurality of stops along the traveling route, and
generate the timetable by calculating a boarding and alighting time estimate of each of the plurality of vehicles at each of the plurality of stops based on at least the passenger information such that a higher average speed of the vehicle between the stops and a longer dwell time of the vehicle at the stop are set for a longer boarding and alighting time estimate, wherein
each of the plurality of vehicles is configured to send traveling status information that indicates a traveling status of the vehicle to the processor, and
when the processor determines, based on the traveling status information, that there is a disabled vehicle that cannot continue service, the processor calculates a boarding and alighting time estimate of a vehicle following the disabled vehicle at a next scheduled stop of the disabled vehicle based on on-board passenger information of the following vehicle, waiting passenger information at the next scheduled stop, and on-board passenger information of the disabled vehicle.

11. A service management method comprising:
receiving, at least from a plurality of vehicles configured to autonomously travel along a preset traveling route or a plurality of stops along the traveling route, passenger information about passengers of the plurality of vehicles;
calculating a boarding and alighting time estimate of each of the plurality of vehicles at each of the plurality of stops based on at least the passenger information;
generating a timetable of each of the plurality of vehicles such that a higher speed of the vehicle between the stops and a longer dwell time of the vehicle at the stop are set for a longer boarding and alighting time estimate;
sending the timetable to the plurality of vehicles;
controlling travel of the plurality of vehicles;
receiving traveling status information that indicates a traveling status of each vehicle of the plurality of vehicles;
determining whether there is a disabled vehicle that cannot continue service; and
calculating a boarding and alighting time estimate of a vehicle following the disabled vehicle at a next scheduled stop of the disabled vehicle based on on-board passenger information of the following vehicle, waiting passenger information at the next scheduled stop, and on-board passenger information of the disabled vehicle when there is the disabled vehicle that cannot continue service.

* * * * *